United States Patent
Hailston

(10) Patent No.: US 6,893,029 B2
(45) Date of Patent: May 17, 2005

(54) HAND TRUCKS AND METHODS OF CONSTRUCTING THEM

(75) Inventor: Bruce L. Hailston, Midland, MI (US)

(73) Assignee: Magline, Inc., Pinconning, MI (US)

( * ) Notice: Subject to any disclaimer, the term of this patent is extended or adjusted under 35 U.S.C. 154(b) by 93 days.

(21) Appl. No.: 10/276,169

(22) PCT Filed: Sep. 25, 2002

(86) PCT No.: PCT/US02/30317

§ 371 (c)(1),
(2), (4) Date: Nov. 12, 2002

(87) PCT Pub. No.: WO2004/033268

PCT Pub. Date: Apr. 22, 2004

(65) Prior Publication Data

US 2004/0056438 A1 Mar. 25, 2004

(51) Int. Cl.⁷ .................................................. B62B 1/00
(52) U.S. Cl. .................................................. 280/47.27
(58) Field of Search .......................... 280/47.131, 47.17, 280/47.18, 47.23, 47.24, 47.27, 47.29, 652, 654; 298/2; D34/26

(56) References Cited

U.S. PATENT DOCUMENTS

| 1,014,400 | A | * | 1/1912 | Koehler ................... 280/47.27 |
| 1,114,853 | A |   | 10/1914 | Brown et al. |
| 2,533,541 | A |   | 12/1950 | Warring |
| 2,820,643 | A | * | 1/1958 | Cohn ......................... 280/659 |
| 3,785,669 | A |   | 1/1974 | Doheny |
| 3,997,182 | A | * | 12/1976 | Mortenson ............... 280/47.27 |
| 4,169,607 | A |   | 10/1979 | Reese |
| 4,278,244 | A |   | 7/1981 | Carter |
| 4,563,014 | A |   | 1/1986 | Mortenson |
| 4,762,333 | A |   | 8/1988 | Mortenson |
| 5,393,081 | A | * | 2/1995 | Mortenson ............... 280/47.27 |
| 5,749,588 | A | * | 5/1998 | Stallbaumer ............. 280/47.27 |
| 6,601,859 | B2 | * | 8/2003 | Durham ................. 280/47.131 |

FOREIGN PATENT DOCUMENTS

DE 640186 12/1983

* cited by examiner

Primary Examiner—Bryan Fischmann
(74) Attorney, Agent, or Firm—Reising, Ethington, Barnes, Kisselle & Learman, P.C.

(57) ABSTRACT

A hand truck, with a vertical frame incorporating side rail channels supported on wheels, and a cargo carrying nose, has a longitudinal cross rail extrusion with terminal ends which extend into the channels. The extrusion in cross-section has top, bottom, and side exterior walls connected with interior curved surfaces defining a longitudinally co-extending socket and threaded channel fasteners tap into the socket to anchor therein. Each side rail channel can be provided with walls cooperating with the rear side wall of the channel to form a rear channel and the wheel brackets connecting the wheels to the side rail channels can be secured by fasteners having parts received in the rear channels.

20 Claims, 5 Drawing Sheets

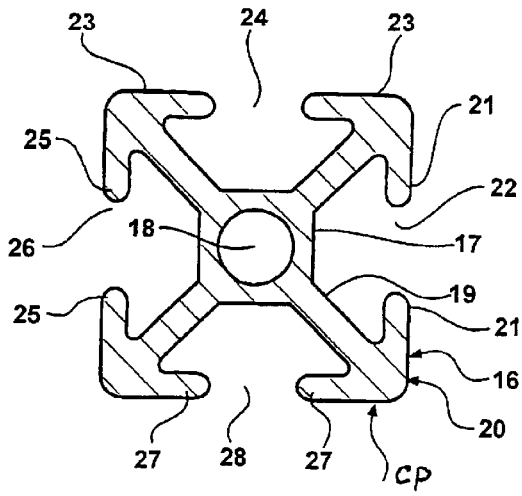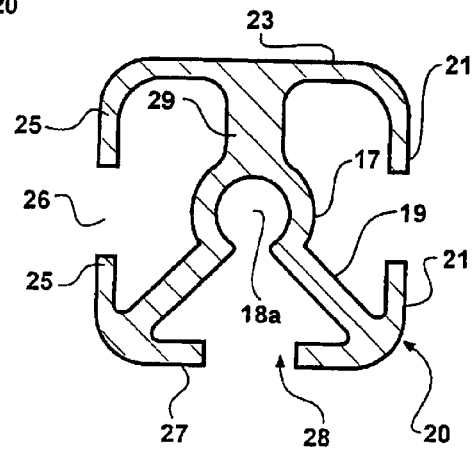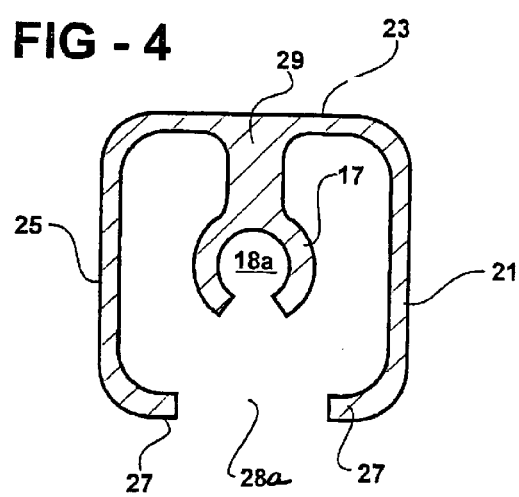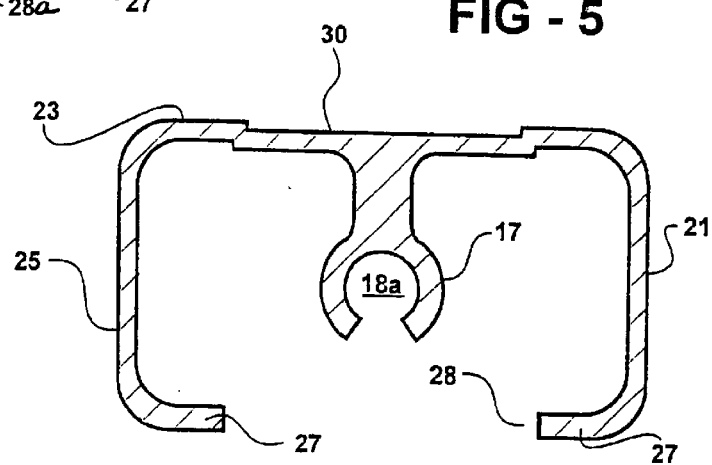

FIG - 6
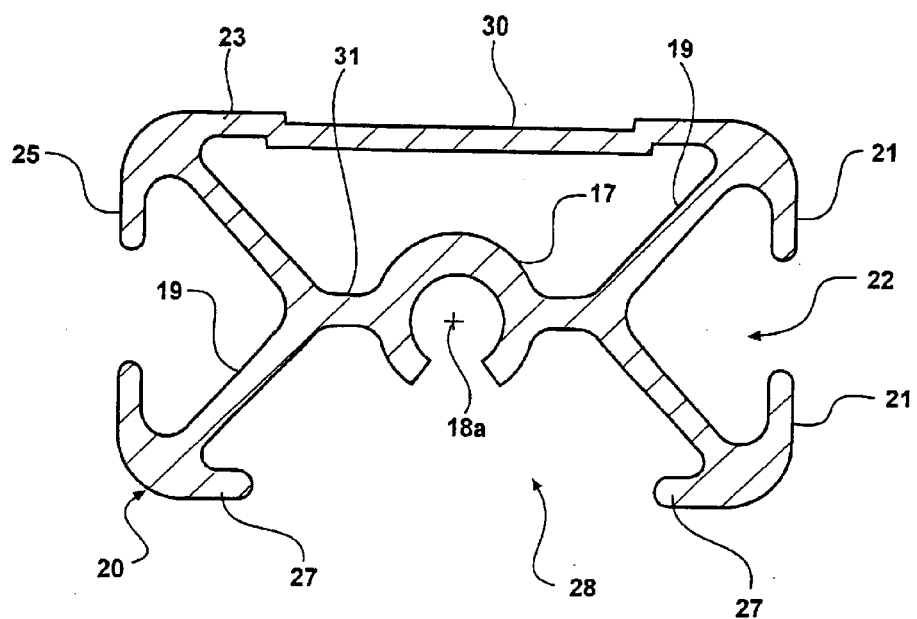
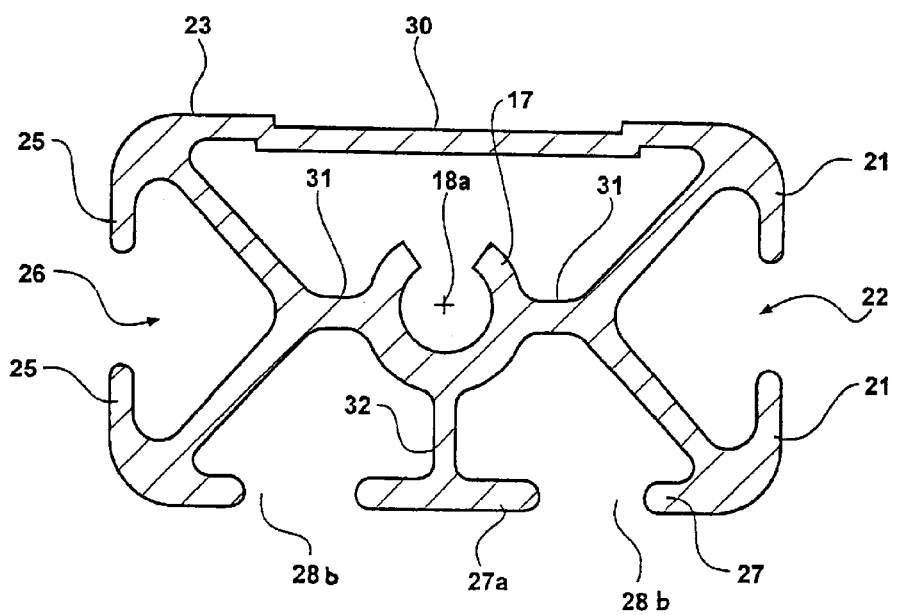
FIG - 7

US 6,893,029 B2

HAND TRUCKS AND METHODS OF CONSTRUCTING THEM

This invention relates to new and useful improvements in hand trucks such as the two-wheeled hand truck, the convertible hand truck, and other product transport hand trucks. Trucks of this type are used in industry in the transport of a wide variety of products of varying configuration such as, for example, heavy rectangular boxes or cartons, appliances, and heavy barrels and kegs.

BACKGROUND OF THE INVENTION

The frames of hand trucks are normally of open or skeleton frame work configuration and include side rail channels in opposing disposition to receive cross brace or cross rail members, which are spaced apart vertically along the frame. The two-wheeled variety of hand truck includes a primary frame adapted in use to assume a generally vertically inclined position. The primary frame includes a generally forwardly projecting cargo supporting nose and at its upper end incorporates a handle portion which is graspable by a user to propel the truck along a path, or up or down a stairway, for example. While hand trucks for transporting cylindrical products such as barrels normally include curvilinear cross rails, two wheeled hand trucks with linear cross rails are also frequently pressed into service to transport heavy barrels, despite the fact there is a substantially line contact of the barrel with the cross rails. Thus, dependent on the "use of the day", the cross rails are expected to bear a considerable load which may be centrally applied at a relatively limited load contact location, or which may be spread over a substantial portion of the length of the cross rail and the side rails. Not only are the cross rails and side rails therefore subject to considerable shear stresses, however, they also are subjected to severe torsional stresses. Such stresses are applied when one wheel of the hand truck is up on a curb and the other is moving to the pavement below or when a load is dumped sidewise off the hand truck, for example.

In the present assignee's Mortenson patent, U.S. Pat. No. 4,563,014, which I incorporate herein by reference, curvilinear injection molded cross braces are utilized, which have vertically aligned sockets for telescopically receiving the ends of the handle and for receiving lightweight package bracing tubes. The ends of the plastic cross rails are received within the side rail channels, but the fastening system requires specially formed brace end walls for receiving a screw, washer and nut assembly. The side rail configuration is not configured as to secure to an inturned portion of the wheel supporting brackets, in addition to the front ends of the brackets.

SUMMARY OF THE INVENTION

The hand truck construction contemplated incorporates lightweight side rails and cross rails in addition to the wheel supporting brackets and handle portions. The side rails may be configured to secure to inturned bracket portions as well as to the front ends of the brackets. In various embodiments of the invention, the generally horizontal cross rails or braces include lengthwisely or longitudinally extending sockets which are centrally disposed and connected to the exterior walls of the cross brace by front to rear extending web walls which extend the length of the cross braces longitudinally coextensive with the sockets. Self-tapping screws can extend through the side rails of the hand truck into the cross braces to secure them in load bearing position.

One of the prime objects of the present invention is to provide a hand truck of the character mentioned which is extremely economical to manufacture and market.

Another object of the invention is to provide a hand truck with side rail and cross brace structures which provide the load bearing and load distributing characteristics which are necessary, in an enhanced improved manner.

Still another object of the invention is to provide a hand truck of the character described which can be readily constructed with reduced labor cost, and without the use of expensive assembly tooling.

Other objects and advantages of the invention will become apparent with reference to the accompanying drawings and the accompanying descriptive matter.

OVERALL DESCRIPTION OF THE DRAWINGS

The presently preferred embodiment of the invention is disclosed in the following description and in the accompanying drawings, wherein:

FIG. 2 is an enlarged cross-sectional view through one of the hand truck cross braces taken on the line 2—2 of FIG. 1;

FIG. 3 is a similarly enlarged, cross-sectional view illustrating an alternative embodiment of the cross brace;

FIG. 4 is a similar view of still another embodiment of the cross brace;

FIG. 5 is a similar view of still a further embodiment of the cross brace;

FIG. 6 is a similar view of a still further alternative embodiment;

FIG. 7 is a still further similar view of yet another embodiment;

DETAILED DESCRIPTION OF THE DRAWINGS

Figure 1:
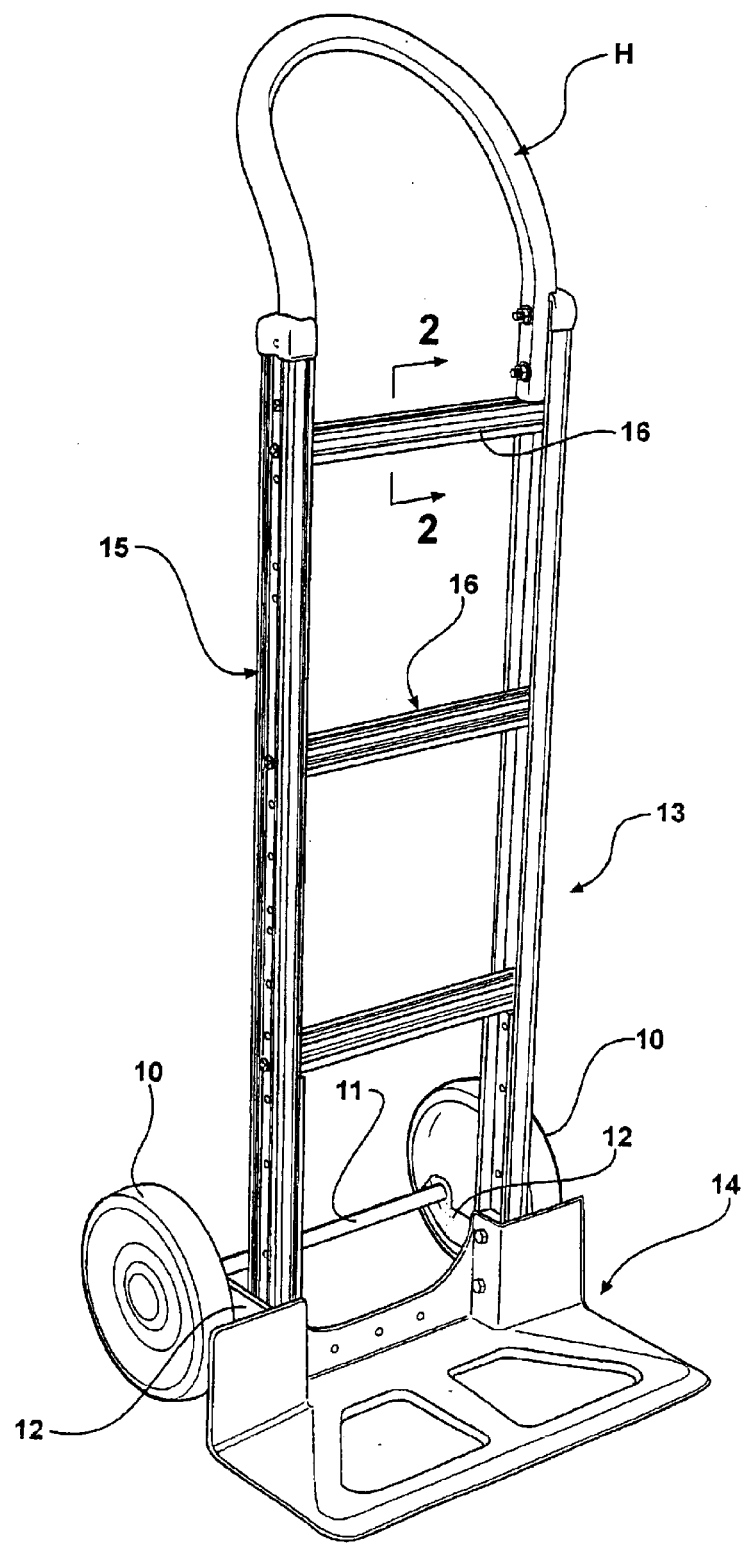
FIG. 1 is a front perspective view of a hand truck which incorporates one embodiment of the invention.

Referring now particularly to the accompanying drawings and in the first instance to FIGS. 1–7 thereof, a hand truck of the general character illustrated in the aforementioned patent and in patents such as U.S. Pat. No. 3,997,182, which I also incorporate by reference is disclosed. The construction includes preferably rubber-tired wheels 10 mounted on an axle 11 to which side brackets 12 are secured. As usual, the side brackets 12 secure to the lower end of a skeletal primary or main frame, generally designated 13, to which a cargo supporting or load carrying nose piece 14 is affixed in the usual manner as, for example, illustrated in the patents to which reference is made. The frame structure 13 incorporates a handle, generally designated H, and may comprise channel shaped side rails, such as shown in the patents and in FIGS. 8–10 hereof, and generally designated 15 or 15*a*, and cross braces, generally designated 16.

FIG. 2 illustrates a cross brace configuration which includes a longitudinally socketed wall structure, generally designated 17, which extends the full length of the extruded cross rails 16 from end to end thereof, and provides a socket 18, which also extends the full length of the cross brace 16 and is open at the ends thereof. In addition, and extending the full length of cross brace 16, are arrow shaped corner portions, generally designated cp, which each comprise a web wall joined to an arrow head shaped corner portion 20. As FIG. 2 illustrates, the cross braces 16 have front walls 21 interrupted by an open portion or slot 22, top walls 23, interrupted by an open portion or slot 24, a rear wall 25, interrupted by a slot or opening 26, and a lower or bottom wall 27, interrupted by a slot or opening 28. Thus, each part of the exterior walls in FIG. 2 is provided as spaced apart wall portions or sections separated by a central spot or opening. The cross brace shown in FIG. 2 is conveniently an extruded aluminum element to provide strength, rigidity, and a structure which is light in weight.

Alternate embodiments are shown in FIGS. 3–8, wherein the same numerals are utilized to describe similar parts. In the FIG. 3 embodiment of the invention, the socket providing structure 17 provides a socket 18a which is open along its bottom side and, as previously, extends the full length of the cross brace and is open at its ends. In this embodiment of the invention, the top wall 23 is continuous and unbroken, and joins to the socket forming structure 17 by a vertically disposed web 29. The remaining web walls 19, described previously as joined to the socket forming structure 17, may be said to extend diagonally in a broadside front to rear direction to the socket structure 17 and diagonally from the structure 17 to the walls 25 and 27 in a front to rear direction.

FIG. 4 is an alternative embodiment in which, again, similar parts are given like numbers. Here, the front and rear side walls 21 and 25 and the top wall 23, are continuous and unbroken, and it is the lower wall 27 which has the central opening or slot 28a from end to end.

FIG. 5 is a cross-sectional rectangular version of FIG. 4, as will be noted. The upper wall 23 includes a groove 30 within which a personalization or identity strip may be secured.

FIG. 6 is another rectangular in cross-section embodiment in which, as in FIG. 5, the top wall 23 is unbroken and contains the groove 30. Here the web walls 19 of the arrow shaped portions 20, connect to the socket forming structure 17 via the horizontal web sections 31.

Figure 8:
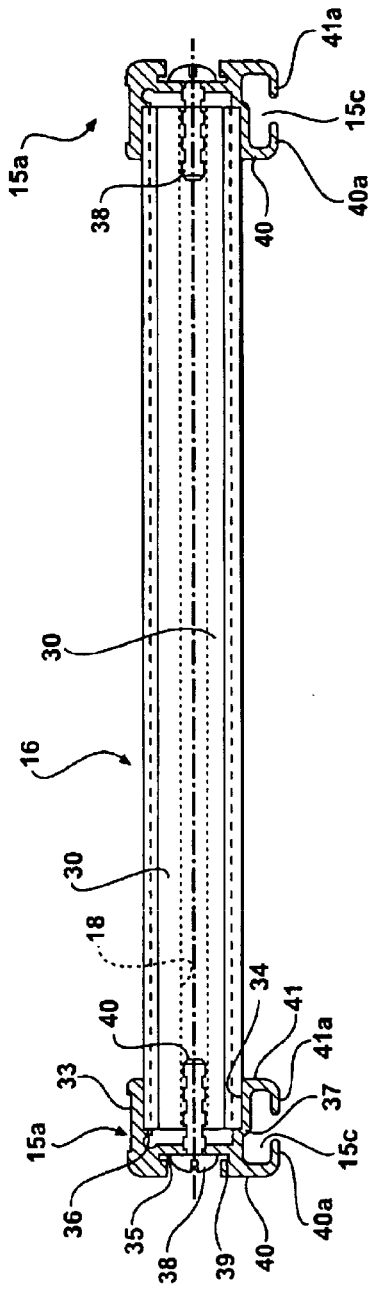
FIG. 8 is a schematic cross-sectional plan view of the interlocked side rail and cross rail structure of the hand truck, the side rail having an alternative construction.

In an alternate structure, FIG. 7, which constitutes the presently preferred embodiment and is also shown in FIG. 8, the bottom wall 27 includes an intermediate portion 27a between two slots or openings 28b which extend from end to end of the brace 16, and the socket forming structure 17 is inverted. The extrusion includes a vertical web wall 32 extending from end to end of the brace 16 and connecting the intermediate coextensive wall portion 27a with the socket forming structure 17.

Figure 9:
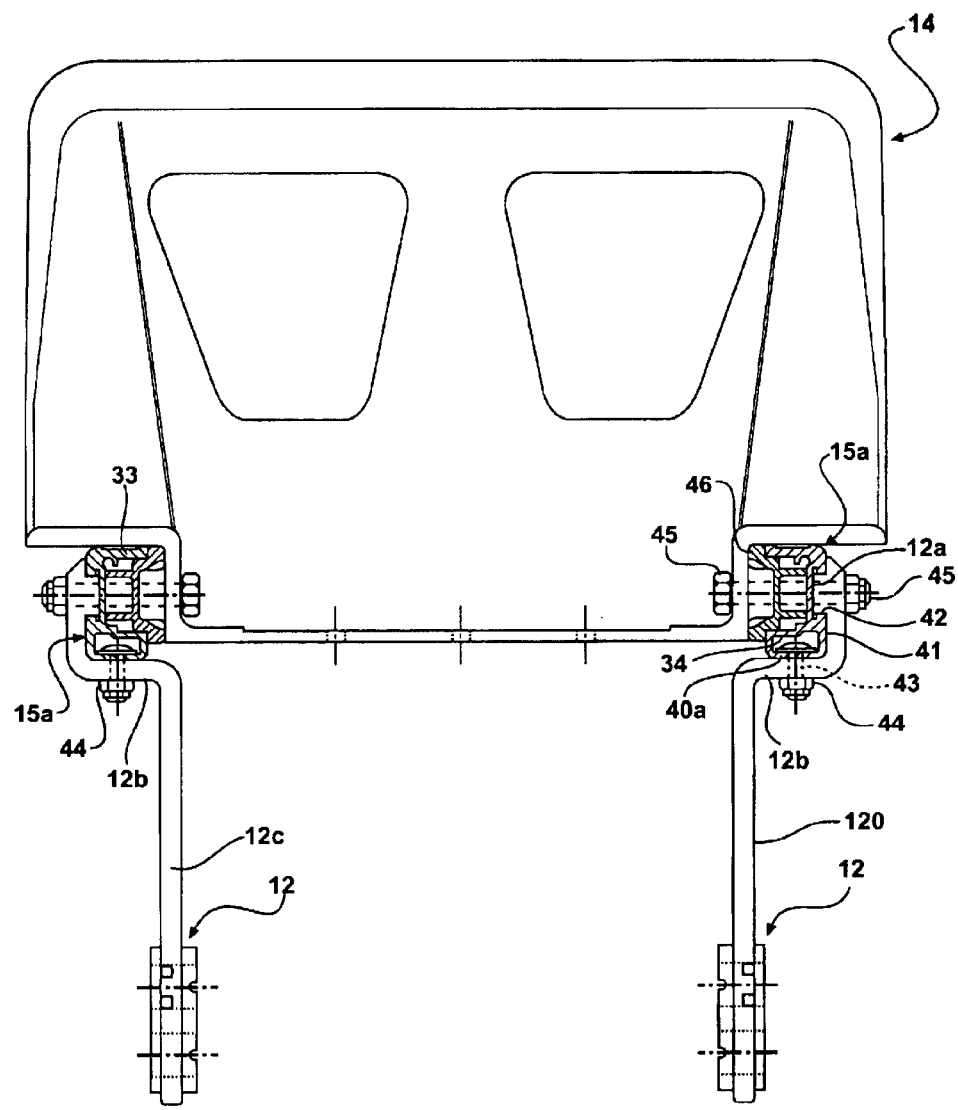
FIG. 9 is a partly sectional top plan view illustrating the manner in which the alternative side rails secure the wheel brackets and wheels to the primary frame.

The structure disclosed in FIGS. 8 and 9 incorporates extruded side rail channels, generally designated 15a, which comprise front and rear legs 33 and 34 connected by an inset cross web wall 35. Each leg 33 includes an internal shoulder or rib 36 extending the length of each side rail 15a, along with a vertically coextensive companion shoulder 37 along each leg 34 for receiving the ends of cross brace 16. The self-tapping screws, generally designated 38, extend through an enlarged opening 39 provided in each web wall 35 and force-thread into the ends of the socket 18, or 18a, each of which is of a diameter slightly less than the maximum diameter of the screw threads 38a.

As shown in FIGS. 8 and 9, the rear leg 34 of each channel 15a is formed with side legs 40 and 41 which are laterally inturned as at 40a and 41a to form a rear channel 15c. The brackets 12, as previously, have key portions 12a which are received within the T-shaped side grooves 42 provided in the channels 15 or 15a. Fastener bolts 45 can be used to secure the brackets 12 to the side rails 15a and to nose piece 14 via side rail fittings 46. In addition, the brackets 12 have laterally inturned portions 12b and rearwardly extending portions 12c to permit the wheels to be more closely spaced apart and conform to the narrow aisles provided in some quarters, and in product transport trucks. As shown in FIG. 9, a fastener bolt 43, with its head within rear channel 15c can be used with a nut 44 to secure the inturned portions 12b to the side rails 15a.

Alternatively, to the side rail structures disclosed in FIGS. 8 and 9, the side rail channel shapes used in either of the aforementioned patents may be alternatively used with cross braces 16, with the length of the cross braces 16 being such as to bottom within the side rail connecting webs front and rear wall.

Figure 10:
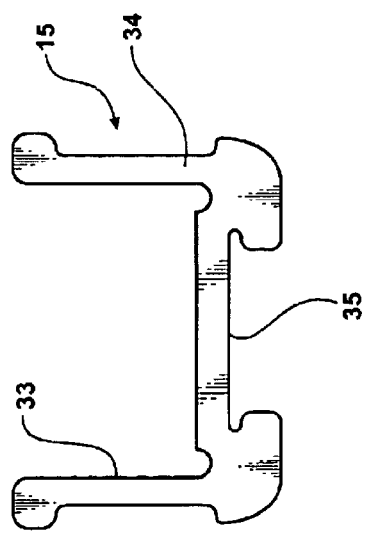
FIG. 10 is an end elevational view of an alternative side rail extrusion.

Still a further alternative structure is shown in FIG. 10 wherein the side rails are similar to the side rails of FIG. 9 but do not include the provision for securement to an inturned portion of wheel brackets 12. The same numerals identify similar parts of the side rail channels 15. Openings 47 are provided in web walls 35 for the self-tapping screws 38.

The operation of the hand truck disclosed is well known and need not be described. The product or products to be carried are placed on the nosepiece 14 and bear against the cross braces 16 and side rails 15 or 15a. In constructing the hand trucks, it is a relatively simple procedure to place the cross braces 16 within the opposed channel-shaped side rails and to simply secure the self-tapping screws 38 into a position of securement within the sockets 18, or 18a. This occurs before the brackets 12 are secured in position to the side rails 15a for ease of assembly purposes.

It is to be understood that the embodiments described are exemplary of various forms of the invention only, and that the invention is defined in the appended claims which contemplate various modifications within the spirit and scope of the invention.

I claim:

1. In a hand truck having a vertical frame incorporating laterally spaced side rails with channels supported on wheels, a cargo carrying nose element connected with said frame, and at least one cross rail disposed longitudinally to said side rails having terminal ends which extend into said side rail channels, the improvement wherein said cross rail in cross-section from one end to another comprises top, bottom, and side wall exterior wall surfaces connected with interior curved surfaces defining a longitudinally co-extending socket, said socket defining web walls connecting with said wall surfaces and curved surfaces, and threaded fasteners extending through said side rail channels into said ends of said cross rail and into said socket.

2. The hand truck of claim 1 wherein said fasteners are self tapping screws.

3. The hand truck of claim 2 wherein said interior curved surfaces are longitudinally partially open.

4. The hand truck of claim 3, wherein said partially open interior curved surfaces in said cross rail are open from end to end and define a socket having a diameter diametrically less than the maximum thread of said screws.

5. The hand truck of claim 1 wherein at least a pair of said web walls are provided to join said exterior wall surfaces with said interior curved surfaces.

6. The hand truck of claim 1 in which one of said exterior wall surfaces of said cross rail is partly open along its length from end to end.

7. The hand truck of claim 1 wherein at least one of said exterior wall surfaces is made up of spaced apart wall sections.

8. The hand truck of claim 1 wherein at least one of said exterior wall surfaces is formed by spaced apart wall sections and said wall sections form part of integrated corner portions from which said web walls extend diagonally in a front to rear direction to connect to said interior curved surfaces.

9. The hand truck of claim 1 in which said exterior side wall surfaces are each comprised of spaced apart side wall sections and said top wall surface is a continuous surface.

10. The hand truck of claim 1 in which said bottom wall surface includes spaced apart bottom wall sections integrated with said side wall sections to form generally right angular confluent corner portions as viewed in cross-section extending from end to end of said cross rail and having said web walls extending diagonally from said corner portions.

11. The hand truck of claim 10 wherein said bottom wall surface includes an intermediate bottom wall surface between said spaced apart bottom wall sections and spaced therefrom which connects with said interior curved surfaces by an upwardly vertically extending web wall.

12. The hand truck of claim 10 wherein said confluent corner portions are arrow-shaped configurations as viewed in cross-section which incorporates said diagonally extending web walls.

13. The hand truck of claim 1 wherein said side top and bottom wall surfaces have mergent corner portions at their confluences, with said web walls extending diagonally in a front to rear direction to brace said interior curved surfaces.

14. A method of assembling a hand truck having a vertical frame with opposed side rail channels supported on wheels, and a cargo carrying nose connected with said frame, comprising:
a) providing a longitudinally extending cross brace having ends sized to be received within said side rail channels and having front and rear exterior wall surfaces connected with surfaces defining a socket, said surfaces being connected to said exterior walls by front to rear extending web walls;
b) placing said ends of the cross brace within said side rail channels; and
c) threading screws supported by said side rails into said sockets to secure said cross rails in position.

15. The method of claim 14 comprising providing said cross brace with top and bottom exterior wall surfaces which merge with said front and rear exterior wall surfaces to form corner portions at their confluences with said web walls, said web walls extending diagonally and forming with said corner portions arrow-shaped bracing portions.

16. The method of claim 14 wherein said side rail channels are formed with front and rear rail walls joined by a connecting wall, and providing pairs of vertically extending ribs spaced inwardly from said side rail connecting walls upon which said ends of the cross brace bear.

17. The method of claim 14 wherein each side rail channel has a rear side wall surface and comprising providing each side rail channel with walls cooperating with said rear side wall surface of said side rail channel to form a rear channel section thereon, said wheels having brackets connecting them to said side rails and providing said brackets with inturned portions with fasteners having parts received in said rear channels sections to secure said brackets to said side rail channels.

18. A hand truck having a generally vertical frame incorporating side rails with front, rear and side faces supported on wheels, a cargo carrying nose element projecting forwardly from said frame at the lower end thereof, and a laterally extending cross rail member connecting said side rails the improvement wherein:
a) each side rail is provided with walls along the rear face of each side rail forming a rear channel;
b) wheel brackets having laterally turned portions lying alongside said rear faces of said side rails, and front to rear extending legs lying alongside said side faces of said side rails and secured thereto for connecting said wheels to support said side rails; and
c) front to rear extending fasteners having portions received in said laterally turned portions of said rear channels to secure said brackets to said side rail channels.

19. The hand truck of claim 18 wherein said hand truck has cross braces with ends received in said side rail channels, and each cross brace includes exterior top, bottom, front and rear side walls and an interior socket forming portion defining an end to end extending socket, each cross brace bottom wall including spaced apart bottom wall portions integrated with said side walls of each said crossbrace to form generally right angular confluent corner portions extending from end to end of each cross brace and having web walls extending diagonally from said confluent portions to connect with said socket forming portion, and fasteners extending through said side rail channels into said socket.

20. A method of assembling a hand truck having a generally vertical frame incorporating side rails with front, rear, and interior and exterior side rail surfaces supported on wheels, a cargo carrying nose element projecting forwardly from said frame at the lower end thereof, and a cross rail member connecting said side rails having terminal ends which extend into said interior side rail surfaces, the improvement comprising:
a) providing each side rail with walls along the rear wall surfaces of said side rails to form side rail rear channels;
b) providing wheel brackets for connecting said wheels to said side rails having laterally turned portions; and
c) securing front to rear extending fasteners having portions received in said side rail rear channels through said laterally turned portions of said brackets to join said brackets to said side rail rear channels.

* * * * *